April 13, 1926.

I. SATAK

RESERVE TANK

Filed June 11, 1925

INVENTOR.
I. Satake
BY F. P. Lorin
ATTORNEYS.

Patented Apr. 13, 1926.

1,580,335

UNITED STATES PATENT OFFICE.

IWAJIRO SATAKE, OF SEATTLE, WASHINGTON.

RESERVE TANK.

Application filed June 11, 1925. Serial No. 36,495.

*To all whom it may concern:*

Be it known that IWAJIRO SATAKE, a subject of the Emperor of Japan, residing at Seattle, in the county of King and State of Washington, has invented certain new and useful Improvements in Reserve Tanks, of which the following is a specification.

This invention relates to improvements in reserve fuel tanks, with the reserve tank capable of being filled during the filling of the main tank and held against delivery to the carbureter except at the will of the operator.

The invention contemplates the use of a reserve tank having a valved atmospheric vent and pipe connection with the main tank, so that on the filling of the latter, the fuel will correspondingly fill the reserve tank. The fuel is trapped in the reserve tank by closing the same against admission of air, so that for ordinary purposes the fuel is drawn from the main tank. At the will of the operator however, and particularly when the reserve tank supply is very low or exhausted, air may be admitted to the reserve tank to thereby permit the gravital flow of the fuel in such reserve tank through the ordinary channels to the carbureter.

The invention is illustrated in the accompanying drawings, in which.

Figure 1:
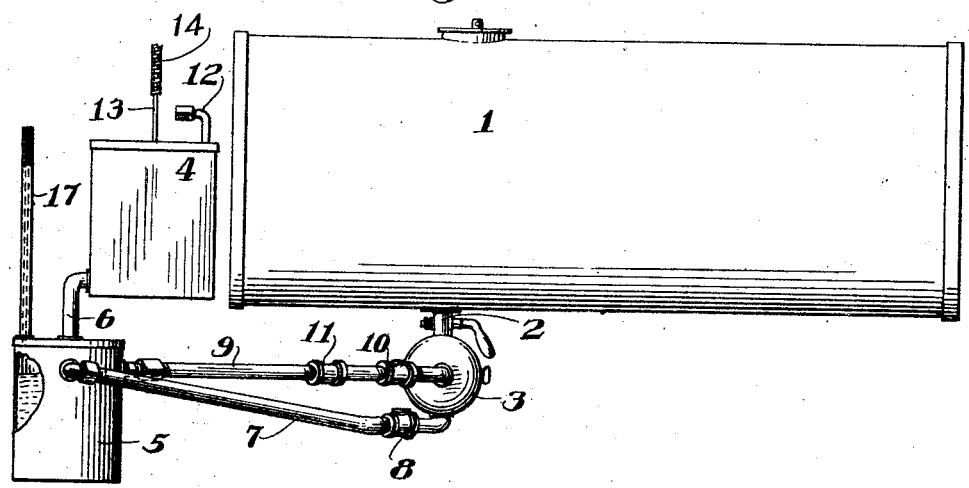
Fig. 1 is a view in front elevation illustrating the invention.
Figure 2:
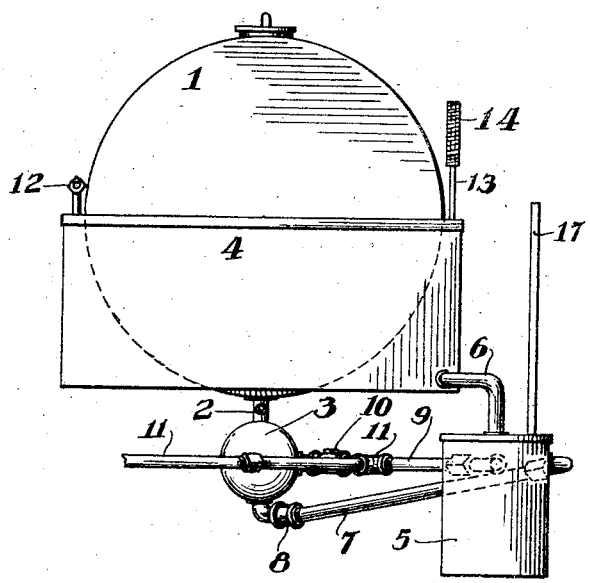
Fig. 2 is an end view of the same.
Figure 3:
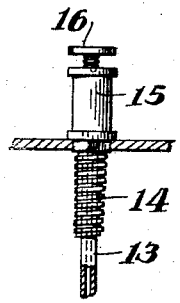
Fig. 3 is a detail in elevation of the manually controlled air inlet for the reserve tank.

In the drawings, 1 represents the main fuel supply tank of the automobile, which may be constructed in any desired manner and arranged at any part of the automobile in accordance with any conventional automobile construction. The tank 1 is provided with an outlet 2 leading through the usual chamber or enlargement 3, serving ordinarily as a sediment bulb. Adjacent the main tank 1 is a reserve tank 4, this tank being of course of less dimension than the main tank and supported in any desired or appropriate manner. A receptacle 5 of materially less size than the reserve tank is in open communication with the latter through a pipe 6. The upper portion of the receptacle 5 is connected by a pipe 7 to the bottom of the sediment bulb, this pipe 7 having a check valve 8 which opens toward the receptacle 5. This receptacle 5 is also connected by means of a pipe 9 with the sediment bulb 3 at a point above the bottom of the latter, such pipe 9 being also provided with a check valve 10, which opens toward the receptacle 5. The tank 5 acts as a trap for sediment from the reserve tank and avoids the necessity of elbow connections in small diameter pipes which would be otherwise necessary if the tank 5 were eliminated. The service pipe line 11 leading to the carbureter or to the vacuum feed system is in open communication with the pipe 9 between the check valve 10 and the receptacle 5.

The reserve tank 4 has a relief valve 12 to permit the escape of air from the reserve tank, but also preventing the entrance of air to the tank through such valve. A vent pipe 13 leads from the upper end of the reserve tank through a conduit, preferably flexible, as 14, to a point convenient to the driver, say for example, on the dash of the vehicle, and is at such point provided with an inlet valve 15, which is normally closed against the admission of air, but which may be manually opened by pressure on the button 16. The inlet valve 15 is of any conventional structure, the sole requirement being that the valve be capable of being open and held in open position at the will of the operator. The chamber 5 is formed with a vent pipe 17, extending upward an appropriate distance and freely open to the atmosphere.

In use, in the filling of the main tank, the fuel will flow to and fill the chamber 5 and reserve tank 4, the air in the receptacle and tank escaping through the relief valve 12. As the reserve tank is preferably of less height than the main tank, it is apparent that the reserve tank will be filled on even a partial filling of the main tank, and it is desired that the reserve tank be of sufficient capacity to permit the automobile to be operated over a considerable distance by the fuel from such reserve tank, in order that when the contents of the main tank is exhausted, the driver may conveniently travel to a nearby service station for a replenishing of fuel supply.

In the ordinary uses, the fuel from the main tank will flow to the carbureter or vacuum service system through the pipe 11, the fuel contained in the reserve tank 4 and receptacle 5 being of course trapped against delivery to such service pipe by the lack of air admission to the surface of such reserve tank. When operating conditions indicate a low supply of fuel in the main tank or the exhaustion of such fuel, the operator opens the valve 15 by properly operating the button 16, thereby admitting air freely to the upper end of the reserve tank and causing the fuel contained therein to flow to and through the service pipe 11. The check valves 8 and 10 serve to prevent the fuel from the exhaust tank from flowing into the main tank, as will be obvious.

I claim:

1. A main fuel tank having a sediment bulb, a fuel receptacle arranged beyond the main tank, a pipe connection between said receptacle and the sediment bulb above the bottom of the latter, a valve in said pipe opening toward the receptacle, an engine service pipe leading from the first mentioned pipe between the valve and receptacle, a second pipe leading from the bottom of the sediment bulb to the receptacle, a reserve tank arranged above and in open communication with the receptacle, an air relief valve for the reserve tank, and means for controlling the admission of air to the reserve tank at will.

2. A main fuel tank having a sediment bulb, a fuel receptacle arranged beyond the main tank, a pipe connection between said receptacle and the sediment bulb above the bottom of the latter, a valve in said pipe opening toward the receptacle, an engine service pipe leading from the first mentioned pipe between the valve and receptacle, a second pipe leading from the bottom of the sediment bulb to the receptacle, a reserve tank arranged above and in open communication with the receptacle, an air relief valve for the reserve tank, a pipe leading from the upper end of the reserve tank and extending to a position convenient to the driver of the vehicle, and a manually controlled air admission valve carried by the engine of the pipe.

In testimony whereof I affix my signature.

I. SATAKE.